(12) United States Patent
Gail et al.

(10) Patent No.: US 7,634,640 B2
(45) Date of Patent: Dec. 15, 2009

(54) DATA PROCESSING APPARATUS HAVING PROGRAM COUNTER SENSOR

(75) Inventors: Markus Gail, Munich (DE); Jan Otterstedt, Unterhaching (DE)

(73) Assignee: Infineon Technologies AG (DE)

( * ) Notice: Subject to any disclaimer, the term of this patent is extended or adjusted under 35 U.S.C. 154(b) by 501 days.

(21) Appl. No.: 11/070,843

(22) Filed: Feb. 24, 2005

(65) Prior Publication Data

US 2005/0182990 A1    Aug. 18, 2005

Related U.S. Application Data

(63) Continuation of application No. PCT/DE03/02430, filed on Jul. 18, 2003.

(30) Foreign Application Priority Data

Aug. 30, 2002  (DE) ............................... 102 40 088

(51) Int. Cl.
*G06F 9/44* (2006.01)
(52) U.S. Cl. ...................... 712/227; 712/245
(58) Field of Classification Search ................. 712/245, 712/227
See application file for complete search history.

(56) References Cited

U.S. PATENT DOCUMENTS

| | | | | |
|---|---|---|---|---|
| 5,241,547 A | | 8/1993 | Kim | |
| 5,357,627 A | * | 10/1994 | Miyazawa et al. | 714/6 |
| 5,408,645 A | * | 4/1995 | Ikeda et al. | 714/55 |
| 5,592,613 A | * | 1/1997 | Miyazawa et al. | 714/6 |
| 5,649,225 A | * | 7/1997 | White et al. | 712/23 |
| 5,724,563 A | * | 3/1998 | Hasegawa | 712/233 |
| 5,838,896 A | * | 11/1998 | Han | 714/23 |
| 5,903,718 A | * | 5/1999 | Marik | 714/38 |
| 6,360,310 B1 | * | 3/2002 | Au | 712/205 |
| 6,363,453 B1 | * | 3/2002 | Esposito et al. | 711/2 |
| 6,378,078 B1 | * | 4/2002 | Ushijima | 713/400 |
| 7,043,717 B2 | * | 5/2006 | Matsumoto et al. | 717/124 |

FOREIGN PATENT DOCUMENTS

| | | |
|---|---|---|
| EP | 0 897 151 A1 | 2/1999 |
| JP | 05-035613 A | 2/1993 |
| JP | 08-016434 A | 1/1996 |
| JP | 10063541 A | 3/1998 |

\* cited by examiner

*Primary Examiner*—Aimee J Li
(74) *Attorney, Agent, or Firm*—Dickstein, Shapiro, LLP.

(57) ABSTRACT

Data processing apparatus having an execution unit, a flow controller having a program counter, and a program counter sensor, which is connected to a data bus and to the program counter. The program counter sensor has a logic unit that ascertains the address of an instruction which is to be executed next from data transferred via the data bus, and a comparator, which compares the ascertained address with a content of the program counter and triggers an alarm signal if there is any discrepancy.

14 Claims, 1 Drawing Sheet

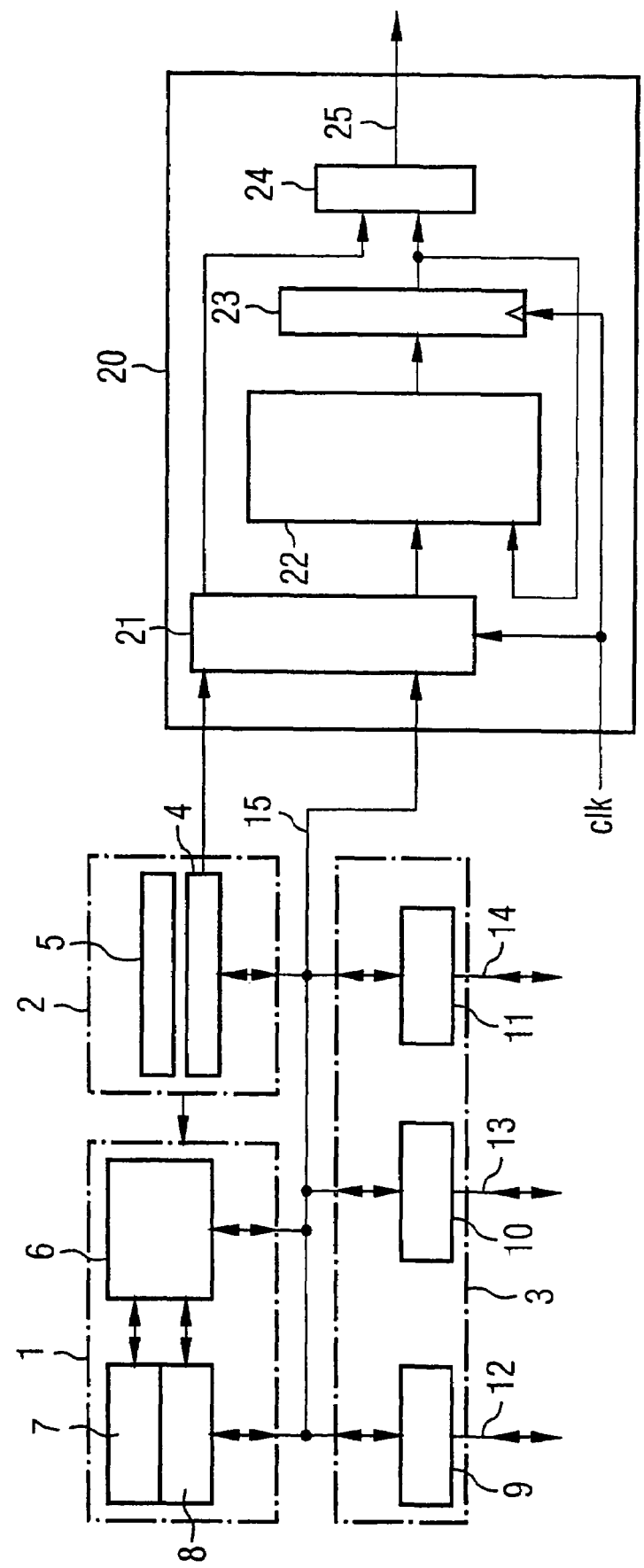

DATA PROCESSING APPARATUS HAVING PROGRAM COUNTER SENSOR

CROSS-REFERENCE TO RELATED APPLICATION

This application is a continuation of International Patent Application Serial No. PCT/DE2003/002430, filed Jul. 18, 2003, which published in German on Mar. 18, 2004 as WO 2004/023274, and is incorporated herein by reference in its entirety.

FIELD OF THE INVENTION

The invention relates to a data processing apparatus having an execution unit and a flow controller which has a program counter.

BACKGROUND OF THE INVENTION

Such data processing apparatuses are known in the form of microcontrollers, for example. The execution unit handles arithmetic and logic instructions. The operands involved are either located in the data and address registers or are applied via an internal bus. The flow controller normally comprises an instruction decoder and a program counter. The program counter calls the instructions in the program successively. The instruction decoder then triggers the steps required for executing the instructions.

When a program starts, the program counter is set to a start address. This address is transferred to a memory via an address bus. A read signal transferred on a control bus prompts the content of the memory area in question to appear on a data bus and to be stored in the instruction decoder. The instruction decoder then triggers the operations required for executing the instruction. Following execution of the instruction, the instruction decoder sets the program counter to the address of the next instruction.

The instruction which is executed next is thus always dependent on the address which is in the program counter.

This key function of the program counter is exploited by hackers when attacking chip cards and security ICs. The attackers attempt to disrupt the components involved in program execution such that the intended program sequence is altered and the microcontroller executes a code other than the intended one. Such unwanted changing of the program flow is referred to as "jumping" the microcontroller. In order to prompt the microcontroller to be jumped, attackers attempt to increase the clock frequency or to inject interference onto the clock line or the supply voltage lines.

In order to prevent such an attack, which results in the microcontroller being jumped, it is known practice to provide a plurality of sensors which detect an excessive frequency or interference on the supply lines, for example. If, by way of example, the excessive frequency sensor responds because the microcontroller is being operated at an increased clock frequency, an attack is assumed and the microcontroller is subjected to a security reset. These sensors are relatively complex to implement, however, because they require analog circuit components.

SUMMARY OF THE INVENTION

It is an object of the invention to specify a data processing apparatus in which jumping is identified securely and easily.

The invention achieves this object by means of a data processing apparatus of the type mentioned initially which has a program counter sensor which is connected to a data bus and to the program counter. The program counter sensor has a logic unit that ascertains the address of an instruction which is to be executed next from data transferred via the data bus, and a comparator which compares the ascertained address with the content of the program counter and triggers an alarm signal if there is any discrepancy.

An advantage of the invention is that it is not necessary to provide a plurality of complex sensors which indirectly ascertain the risk of jumping by detecting interference which can result in jumping. Instead, the means for ascertaining the address of an instruction which is to be executed next, which means operate in parallel with the program counter, are used to ascertain the address of the next instruction independently of the program counter. During a correct mode of operation, the ascertained address has to match the content of the program counter.

It is particularly advantageous if both the data on the data bus and the content of the program counter are processed with a delay. This prevents interference generated by attackers from affecting either the program counter or the program counter sensor.

It is therefore also particularly advantageous if the program counter sensor is produced using a different circuit technology than the flow controller with the program counter. The effect achieved by this is that the sensitivity to interference and the response to interference differ.

The inventive program counter sensor can be manufactured particularly easily and inexpensively, since it can be constructed just from logic components and no analog components are required. Another advantage in this context is that the program counter sensor can be hidden in the normal logic and is thus protected against any physical attack. In addition, such a sensor is much easier to test than a sensor with analog components.

The invention is explained in more detail below using an exemplary embodiment.

BRIEF DESCRIPTION OF THE DRAWING

The single FIGURE shows a schematic illustration of a microcontroller with an inventive program counter sensor.

DETAILED DESCRIPTION OF PREFERRED EMBODIMENTS OF THE INVENTION

The left-hand half of FIG. 1 shows a microcontroller based on the prior art with the fundamental components. It has an execution unit 1, a flow controller 2 and a bus interface 3. The execution unit 1 contains an arithmetic and logic unit 6 and also a data register 7 and an address register 8. The flow controller 2 comprises a program counter 4 and an instruction decoder 5. The bus interface has drivers 9, 10 and 11 for a data bus 12, a control bus 13 and an address bus 14, respectively. The execution unit 1, the flow controller 2 and the bus interface 3 are connected to one another by means of an internal bus 15. The fundamental way in which this microcontroller based on the prior art works has already been illustrated in the background section above.

The right-hand half of FIG. 1 shows an inventive program counter sensor which extends a microcontroller based on the prior art. The program counter sensor 20 has a delay apparatus 21 formed by registers, a logic unit 22 for identifying instructions and new program counter values, and a program counter simulation 23. In addition, there is a comparator 24 which compares the value stored in the program counter simulation 23 with the content of the actual program counter 4, which in this exemplary embodiment is provided following a delay by the delay apparatus 21. The registers in the delay apparatus 21 store the current content of the program counter 4 and also transferred data 15 so that the program counter sensor 20 thus obtains a temporally offset ascertainment of a program counter value with respect to the flow controller 2. Attacks which result in incorrect fixing of a new value for the program counter 4 (jumping) therefore do not also result in an error in the ascertainment of the next instruction to be executed in the program counter sensor 20, which increases the reliability of attack identification. The logic unit 22 for identifying instructions and new program counter values and also the program counter simulation 23 correspond in terms of their operation to the functional units in the flow controller 2, which are responsible there for ascertaining the new value for the program counter 4.

In line with the invention, the new program counter value is thus ascertained in parallel by the program counter sensor 20. The content of the program counter simulation 23 is then compared with the content of the program counter 4 in a comparator 24. In the exemplary embodiment in FIG. 1, this is done at a later time than the fixing of the content of the program counter 4. The comparison's temporal shift caused by the registers 21 for delay purposes should be at least one clock cycle, but can also be stretched to a plurality of clock cycles. For the data processing in the program counter sensor 20, a clock signal CLK is supplied to the latter.

In order to identify instructions, the logic unit 22 continually checks the transferred data 15 to determine whether they contain instructions and whether these have new values for the program counter or the program counter simulation 23. As soon as an instruction is identified which contains an address for an instruction which is to be executed next (e.g. a jump instruction), the address of the new instruction is stored in the program counter simulation 23. If the identified instruction does not bring about any explicit alteration of the program counter, that is to say if a linear program flow exists, then the address stored in the program counter simulation 23 is incremented on the basis of the instruction length and thus points to the linearly next instruction which is to be executed, as also occurs in the flow controller 2 for the program counter 4.

If the comparator 24 establishes that the compared contents of the program counter simulation 23 and of the program counter 4 differ, it outputs an alarm signal 25. This can subsequently be used to implement a security reset for the data processing apparatus. Alternatively, it would be possible to take other countermeasures, triggered by the alarm signal 25.

The schematic illustration of FIG. 1 shows the components of a microcontroller based on the prior art and those of the program counter sensor 1 separately from one another. In a real embodiment, however, the components of the program counter sensor 20 are integrated in the circuit which also comprises the standard components. It is therefore very difficult to identify the program counter sensor 20 in the overall circuit, which means that there is good protection against physical attack by an attacker. Protective mechanisms which protect the standard components of the microcontroller thus automatically also afford protection for the components of the program counter sensor 20.

On the other hand, it is advantageous for the program counter sensor 20 to be produced using different circuit technology than the actual program counter 4, because this ensures that these components react differently to interference.

What is claimed is:

1. A data processing apparatus comprising:
   an execution unit;
   a flow controller having a program counter; and
   a program counter sensor, which is connected by a data bus to the execution unit and is further connected independently by a separate bus to the program counter, the program counter sensor comprising:
      a logic unit configured to continually check data transferred on the data bus and further configured to ascertain an address of an instruction from the data, wherein the instruction is the next instruction to be executed by the execution unit;
      a program counter simulator coupled to the logic unit and configured to store the ascertained address; and
      a comparator configured to compare the content of the program counter simulator with current content of the program counter and configured to trigger an alarm signal if there is any discrepancy.

2. The data processing apparatus as claimed in claim 1, wherein the program counter sensor further comprises a delay apparatus which delays the data on the data bus and the content of the program counter.

3. The data processing apparatus as claimed in claim 2, wherein the delay apparatus delays the data on the data bus and the content of the program counter by one clock cycle.

4. The data processing apparatus as claimed in claim 2, wherein the delay apparatus delays the data on the data bus and the content of the program counter by a plurality of clock cycles.

5. The data processing apparatus as claimed in claim 2, wherein the alarm signal triggers a reset for the data processing apparatus.

6. The data processing apparatus as claimed in claim 2, wherein the program counter sensor is produced using different circuit technology than the flow controller.

7. The data processing apparatus as claimed in claim 1, wherein the alarm signal triggers a reset for the data processing apparatus.

8. The data processing apparatus as claimed in claim 7, wherein the program counter sensor is produced using different circuit technology than the flow controller.

9. The data processing apparatus as claimed in claim 1, wherein the program counter sensor is produced using different circuit technology than the flow controller.

10. The data processing apparatus as claimed in claim 1, wherein the program counter simulator is further configured to increment the stored address on the basis of the instruction length if the transferred instruction does not contain an explicit address.

11. A data processing apparatus comprising:
    an execution unit;
    a flow controller having a program counter; and
    a program counter sensor, which is connected by a data bus to the execution unit and is further connected independently by a separate bus to the program counter by means other than the data bus, comprising:
       means for continually checking data transferred on the data bus and means for ascertaining an address of an instruction from the data, wherein the instruction is the next instruction to be executed by the execution unit;
       a simulation means for storing the ascertained address; and
       a comparing means for comparing the stored address of the program counter simulator with current content of the program counter and for triggering an alarm signal if there is any discrepancy.

12. The data processing apparatus as claimed in claim 11, wherein the program counter sensor further comprises incrementing means for incrementing the stored address on the basis of the instruction length if the transferred instruction does not contain an explicit address.

13. A method for detecting program counter, wherein a data processing apparatus comprises an execution unit; a flow controller having a program counter and a program counter sensor which is connected by a data bus to the execution unit and is further connected independently by a separate bus to the program counter, the method comprising:

continually checking data transferred on the data bus;

determining independently if the data transferred via the data bus contains at least one instruction;

determining if the at least one instruction contains an address for an instruction which is the next instruction to be executed by the execution unit;

storing the ascertained address by a program counter simulator; and comparing the address stored in the program counter simulator with current content of the program counter and triggering an alarm signal if there is any discrepancy.

14. The method according to claim 13, further comprising incrementing the address stored in the program counter simulator on the basis of the instruction length if the transferred instruction does not contain an explicit address.

* * * * *